3,819,754
AMIDOTHIONOPHOSPHONIC ACID ESTERS
Masahiro Aya and Shigeo Kishino, Tokyo, Akio Kudamatsu, Kanagawa, Nobuo Fukazawa and Toyohiko Kume, Tokyo, and Kozo Shiokawa, Kanagawa, Japan, assignors to Bayer Aktiengesellschaft, Leverkusen, Germany
No Drawing. Filed Nov. 10, 1971, Ser. No. 197,524
Claims priority, application Japan, Nov. 17, 1970, 45/100,850
Int. Cl. A01n 9/36; C07f 9/24
U.S. Cl. 260—954                                                17 Claims

ABSTRACT OF THE DISCLOSURE

Novel amidothionophosphonic acid ester compounds of the formula $$\begin{array}{c} C_2H_5 \quad S \\ \diagdown \parallel \\ P-O-\underset{RNH}{\diagup} \end{array} \underset{}{\overset{NO_2}{\bigcirc}} Y \qquad (I)$$

wherein R is lower alkyl or cycloalkyl; and Y is hydrogen, halogen or lower alkyl are outstandingly effective as herbicides and exhibit particular selective action, e.g., against weeds growing in rice paddies.

---

This invention relates to novel amidothionophosphonic acid ester compounds, to herbicidal compositions containing them, and to their utilization for controlling harmful weeds.

More specifically, this invention relates to novel amidothionophosphonic acid ester compounds of the formula:

$$\begin{array}{c} C_2H_5 \quad S \\ \diagdown \parallel \\ P-O-\underset{RNH}{\diagup} \end{array} \underset{}{\overset{NO_2}{\bigcirc}} Y \qquad (I)$$

wherein R is lower alkyl or cycloalkyl; and Y is hydrogen, halogen or lower alkyl
and to a herbicidal agent comprising said amidothionophosphonic acid ester compounds as active ingredients.

The instant compounds are remarkably active biologically, particularly herbicidally, and demonstrate greater activity than structurally related compounds known to the art. For example, amidothionophosphoric acid esters of the following general formula:

$$\begin{array}{c} RO \quad S \\ \diagdown \parallel \\ R' \diagup P-O-\bigcirc-Y' \\ \diagup N \\ R'' \end{array} \qquad (II)$$

are disclosed in British Pat. No. 659,682. In formula (II), R is alkyl or alkenyl, R' and R" are alkyl, with the proviso that R" may be a hydrogen atom, and one of Y's is nitro and the other is hydrogen or another nitro. From said British Patent it appears that compounds of the above structure (II) are useful as insecticides and fungicides.

However, the amidothionophosphonic acid esters of this invention, i.e. those of general formula (I), have prominent herbicidal activity, and surprisingly it has been found that the compounds of this invention exhibit biological activity superior to those disclosed in the U.K. patent.

Especially when the compounds of this invention are applied as herbicides to paddy fields, they exhibit excellent herbicidal activity against weeds belonging to the rice plant family, broadleaved weeds and perennial weeds, while they exhibit no phytotoxicity against the rice plant. Further, when they are applied to soil before emergence of weeds, they exhibit an excellent herbicidal activity, while inducing no phytotoxic effect against cultivated plants if the amount applied is properly chosen. Thus, the compounds of this invention are much superior to conventional herbicides in that they exhibit excellent selective herbicidal activity.

When the compounds of this invention are used in large amounts, e.g. from 5.0–40 kg. per hectare calculated as active ingredient, they exhibit a non-selective or total herbicidal activity. However, when they are used in small amounts, e.g. from 1.0 to 5.0 kg. per hectare, they exhibit excellent selective herbicidal activity. For this reason, they can be used as germination preventing agents, especially as weed controlling agents. The term "weed" is used in the broadest sense in this specification to include all the plants growing on places where their growth is not desired.

As indicated above, the compounds of this invention exhibit excellent selective activity when applied in a suitable amount, for instance from 1.0 to 5 kg. per hectare, and they can be used as herbicides especially for controlling weeds growing on fields and paddy fields. More specifically, they exhibit a herbicidal activity against *dicotyledons* such as catch weed (Galium), common chick weed (Stellaria), camomile (Matricaria), French-weed (Galinsoga), goosefoot (Chenopodium), stinging nettle (Urtica), groundsel (Senecio), wild amaranthus (*Amaranthus blitum*), common purslane (*Partulaca oleracea*) and crab grass (Digitaria), and *monocotyledons* such as timothy, causeway grass (*Eragrostis multicaulis*), pescues, fingergrass (*Digitaria sanguinalis*), goosegrass (*Eleusine indica*), green foxtail (*Sataria viridis*), ray grass and barnyard grass (*Panicum crusgalli*). However, they do not give any phytotoxicity to *dicotyledons* such as mustard, leaf mustard, cotton, carrot, leguminous crops, potato, coffee, beet and cabbage, and *monocotyledons* such as maize, rice oat, barley, wheat, millet and sugar cane.

The compounds of this invention have very low toxicity against warmblooded animals.

The instant invention also provides a novel process for making the instant novel compounds. One aspect of the process of this invention is set forth in the following reaction formula:

Method A $$\begin{array}{c} C_2H_5 \quad S \\ \diagdown \parallel \\ P-Cl \\ RNH \end{array} + MO-\underset{}{\overset{NO_2}{\bigcirc}} Y \longrightarrow$$

(III)                (IV)

$$\begin{array}{c} C_2H_5 \quad S \\ \diagdown \parallel \\ P-O-\underset{RNH}{\diagup} \end{array} \underset{}{\overset{NO_2}{\bigcirc}} Y + M.Cl$$

(I)

wherein R and Y are as defined above, and M is hydrogen or a metal atom or ammonium group.

Specific examples of "R" are lower alkyl groups such as methyl, ethyl, n-propyl, iso-propyl, n-butyl, iso-butyl, sec-butyl and tert-butyl, and cycloalkyl groups such as cyclopentyl and cyclohexyl. Specific examples of Y are hydrogen, halogens such as fluorine, chlorine, bromine and iodine, and lower alkyl groups such as recited above with respect to R.

As the ethanethionophosphonamide chloride of general formula (III), there may be exemplified N-methyl-ethanethionophosphonamide chloride, N-ethyl-ethanethionophosphonamide chloride, N-n-(or iso-)propyl-ethanethionophosphonamide chloride, N-n-(or iso- or sec-) butyl-ethanethionophosphonamide chloride and N-cyclohexyl-ethanethionophosphonamide chloride. As the phenol of general formula (IV) there may be mentioned 2-nitrophenol, 2-nitro-4-methyl-phenol, 2-nitro-4-tert-butyl-phenol, 2-nitro-4-chloro-phenol and 2-nitro-4-bromo-phenol.

It is preferably that the above process of this invention is conducted in the presence of a solvent or a diluent. As a solvent or a diluent there may be cited water; aliphatic, alicyclic and aromatic hydrocarbons (which may be halogenated) such as hexane, cyclohexane, petroleum ether, ligroin, benzene, toluene, xylene, methylene chloride, chloroform, carbon tetrachloride and chlorobenzene; ethers such as diethyl ether, methyl ethyl ether and tetrahydrofuran; ketones such as acetone, methyl ethyl ketone and methyl isobutyl ketone; nitriles such as acetonitrile, propionitrile and acrylonitrile; alcohols such as methanol, ethanol, isopropanol, butanol and ethylene glycol; esters such as ethyl acetate and amyl acetate; acid amides such as dimethyl formamide and dimethyl acetamide; and sulfoxides and sulfones such as dimethyl sulfoxide and sulfolane. This method may be carried out in the presence of an acid binder according to need. As the acid binder there may be used hydroxides, carbonates, bicarbonates and alcoholates of alkali metals and tertiary amines such as triethylamine, diethylaniline and pyridine.

When the reaction is carried out in the absence of an acid binder, the intended product can be obtained by forming in advance a salt, preferably a metal or ammonium salt, of a corresponding phenol and then reacting the salt with an ethanethionophosphonamide chloride.

The ethanethionophosphonamide chlorides of general formula (III) to be used as the starting compounds in the process of this invention may be synthesized by a general method expressed by the following reaction formula:

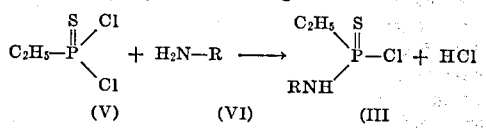

wherein R is as defined above.

An alternative aspect of the method of this invention is set forth below and is designated as "Method B."

Method B

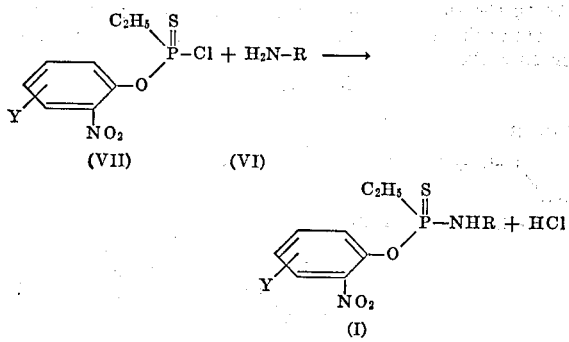

wherein R and Y are as defined above.

As illustrative of the thionophosphonyl chloride of general formula (VII), there may be mentioned O-(2-nitrophenyl)ethanethionophosphonyl chloride,
O-(2-nitro-4-methylphenyl)ethanethionophosphonyl chloride,
O-(2-nitro-4-tert-butylphenyl)ethanethionophosphonyl chloride,
O-(2-nitro-4-chlorophenyl)ethanethionophosphonyl chloride and
O-(2-nitro-4-bromophenyl)ethanethionophosphonyl chloride.

The amine of general formula (VI) is exemplified by methylamine, ethylamine, n-propylamine, iso-propyl-amine, n-butylamine, iso-butylamine, sec-butylamine and cyclohexylamine. It is preferable to conduct the above method (B) in the presence of a solvent or diluent such as recited above. In conducting this method, 2 moles of the amine of formula (VI) is used per mole of the ethanethionophosphonyl chloride of formula (VII), but it is possible to use an excess of the amine. It is also possible to use 1 mole of the amine and 1 mole of an alkali per mole of the ethanethionophosphonyl chloride.

The thionophosphonyl chloride of formula (VII) to be used as the starting compound in Method (B) of this invention may be synthesized, for instance, by a general method expressed by the following reaction formula:

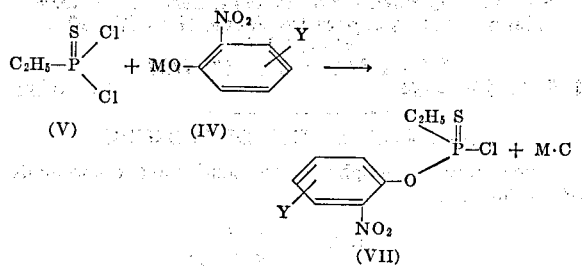

wherein M and Y are defined as above.

As exemplary of nitrophenols of formula (VI), there may be mentioned 2-nitro-phenol,
2-nitro-4-methyl-phenol,
2-nitro-4-tert-butyl-phenol,
2-nitro-4-chloro-phenol and
2-nitro-4-bromo-phenol.

The above method for making the starting materials (VII) is preferably carried out in a solvent or diluent such as recited above.

According to either Method A or B, the process of this invention is carried out at temperatures in a broad range, but generally the reaction is carried out at temperatures ranging from −20° C. to the boiling point of the reaction mixture, preferably temperatures being in the range of 0 to 100° C. The reaction may be conducted preferably under atmospheric pressure, but it is possible to carry out the reaction under elevated or reduced pressure.

The preparation of active compounds of this invention is specifically illustrated in the following synthesis examples.

EXAMPLE 1

Preparation of O-(2-nitro-4-methylphenyl)-N-iso-propyl-ethanethionophosphonamide

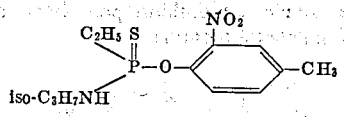

A. 30.6 g. of 2-nitro-p-cresol was dissolved in 500 ml. of acetonitrile and 27.7 g. of anhydrous potassium carbonate was added to the solution. The mixture was agitated for 50–55° C. for 30 minutes and to the mixture was added dropwise 37.1 g. of N-iso-propyl-ethanethionophosphonamide chloride at 50–55° C. The reaction was effected under agitation for 1 hour at 55–60° C. and for 2 hours at 65–70° C. The acetonitrile was distilled off from the reaction mixture and 500 ml. of benzene was added to the residue. Then, the mixture was transferred to a separating funnel and washed with a 2% aqueous solution of potassium hydroxide and then with water, followed by drying over anhydrous sodium sulfate. The benzene was distilled off under reduced pressure. Thus there was obtained 49 g. of a faintly yellow crystals of O-(2-nitro-4-methylphenyl)-N-iso-propyl-ethanethionophosphonamide.

The product recrystallized from alcohol had a melting point of 64° C.

The preparation of the N-iso-propyl-ethanethionophosphonamide chloride used as the starting compound in above Example 1 will now be explained by referring to Example 1B.

B. Preparation of N-iso-propyl-ethanethionophosphonamide chloride

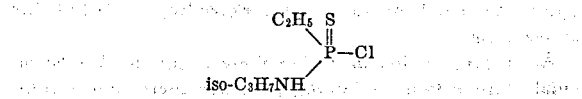

81.5 g. of ethanethionophosphonyl dichloride was dissolved in 300 ml. of toluene and while the solution was maintained at a temperature below 0° C., 59.1 g. of iso-propyl amine was added dropwise to the solution. After completion of the dropwise addition, the agitation was conducted at the above temperature for 1 hour and at room temperature for subsequent 3 hours. The iso-propyl amine hydrochloride was separated by filtration, and toluene was removed from the filtrate by distillation under reduced pressure. Thus, there was obtained 55 g. of N-iso-propyl-ethanethionophosphonamide chloride having a boiling point of 90–95° C. under 0.5 mm. Hg.

EXAMPLE 2

Preparation of O-(2-nitro-4-methylphenyl)-N-iso-propyl-ethanethionophosphonamide

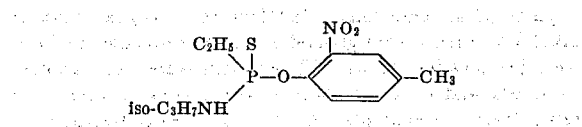

A. 28 g. of O-(2-nitro-4-methylphenyl)-ethanethionophosphonyl chloride was dissolved in 250 ml. of benzene, and at 10–25° C. 11.8 g. of iso-propylamine was added dropwise to the solution. After completion of the dropwise addition, the mixture was agitated at 55–60° C. for 1 hour. The reaction mixture was cooled to room temperature, and washed with 1% hydrochloric acid, 2% potassium hydroxide and then with water, following which the benzene layer was dried over anhydrous sodium sulfate. The benzene was distilled off and the residue was recrystallized from alcohol. Thus there was obtained 27 g. of O-(2-nitro-4-methylphenyl)-N-iso-propyl-ethanethionophosphonamide having a melting point of 64° C.

The preparation of O-(2-nitro-4-methylphenyl)-ethanethionophosphonyl chloride used as starting compound in Example 2 will now be explained by referring to Example 2B.

B. Preparation of O-(2-nitro-4-methylphenyl)-ethanethionophosphonyl chloride

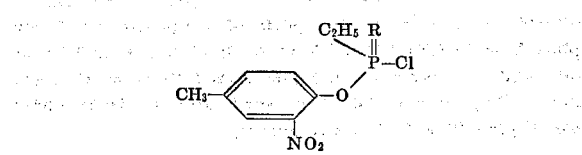

81.5 g. of ethanethionophosphonyl dichloride and 76.6 g. of 2-nitro-4-cresol were dissolved in 300 ml. of benzene, and 50.6 g. of triethyl amine was added dropwise under agitation to the solution at 10–15° C. After completion of the dropwise addition, the mixture was agitated for 2 hours at room temperature, and the precipitated triethyl amine hydrochloride was separated by filtration. Distillation of benzene from the filtrate gave 112 g. of O-(2-nitro - 4-methylphenyl) - ethanethionophosphonyl chloride having a boiling point of 135–143° C. under 0.3 mm. Hg.

The following compounds were synthesized by methods similar to those described above and their properties are set forth in Table 1.

TABLE 1

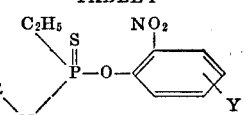

| Compound number | R | Y | Physical properties |
|---|---|---|---|
| 1 | $CH_3$ | H | M.P. 50–51° C. |
| 2 | $CH_3$ | 4-$CH_3$ | M.P. 95–96° C. |
| 3 | $C_2H_5$ | 4-$CH_3$ | M.P. 52–53.5° C. |
| 4 | n-$C_3H_7$ | H | $n_D^{20}$ 1.5670. |
| 5 | iso-$C_3H_7$ | H | $n_D^{20}$ 1.5492. |
| 6 | iso-$C_3H_7$ | 4-$CH_3$ | M.P. 64° C. |
| 7 | n-$C_4H_9$ | 4-$CH_3$ | M.P. 39–41° C. |
| 8 | iso-$C_4H_9$ | 4-$CH_3$ | M.P. 46–47° C. |
| 9 | sec-$C_4H_9$ | H | $n_D^{20}$ 1.5602. |
| 10 | sec-$C_4H_9$ | 4-$CH_3$ | $n_D^{20}$ 1.5578. |
| 11 | ⟨H⟩ | H | $n_D^{20}$ 1.5738. |
| 12 | iso-$C_3H_7$ | 4-$C_4H_9$ tert. | $n_D^{20}$ 1.5430. |
| 13 | iso-$C_3H_7$ | 4-Cl | $n_D^{20}$ 1.5580. |
| 14 | iso-$C_3H_7$ | 4-Br | $n_D^{20}$ 1.5702. |

The compounds of this invention exhibit broad range pesticidal action, e.g., as insecticides, acaricides and nematocides, but in addition, exhibit particular outstanding activity as herbicides. In the latter use application, they may be used as post-emergence herbicides or as pre-emergence herbicides, in which case they are applied to the weed habitat, and damage or destroy the weeds prior to their emergence.

When compounds of this invention are used as herbicides, they are directly diluted with water as they are or after they have been mixed with agricultural assistants, and they are applied in various forms in a customary method adopted in the preparation of agricultural chemicals. In the actual application, they are used as they are or after they have been diluted with water to the desired concentration.

As agricultural adjuvants, there may be cited inert solvents and/or diluents (bulking agents or carriers). These assistants are used for conducting active ingredients to weeds and/or places where weeds grow. Further, there may be cited various surfactants and/or organic materials, for instance, spreaders (stickers) and aerosol propellants, and promoters (which are used for assuring, maintaining, and increasing the activity of active ingredients).

As the solvent there may be exemplified water and organic solvents such as aliphatic and alicyclic hydrocarbons (for instance, n-hexane, gasolines for industrial use, e.g., petroleum ether and solvent naphtha, and petroleum fractions, e.g., paraffin wax, kerosene, light oil, middle oil and heavy oil), aromatic hydrocarbons (for instance, benzene, toluene, xylene and aromatic naphtha), halogenated hydrocarbons (for instance, chloromethylene, chloroethylene, carbon tetrachloride, trichloroethylene, ethylene dibromide and chlorobenzene), alcohols (for instance, methyl, alcohol, ethyl alcohol, propyl alcohol and propylene glycol), ethers (for instance, ethyl ether, ethylene oxide and dioxane), alcohol ethers (for instance, ethylene glycol monomethylether), ketones (for instance, acetone and isophorone), esters (for instance, ethyl, acetate and amyl acetate), amides (for instance, dimethylformamide and dimethylacetamide), and sulfoxides (for instance, dimethylsulfoxide).

As the diluent (bulking agent or carrier) there may be exemplified vegetable powders; mineral powders such as clay substances (for instance, keolinites, montmorillonites and attapulgite, talc, pyrophyllite, mica, gypsum, calcite, vermiculite, dolomite, muscovite, apatite, slaked lime, magnesium hydroxide, diatomaceous earth, inorganic salts (for instance, calcium carbonate), sulfur and pumice; synthetic mineral powders such as highly dispersed silicic acid and synthetic aluimna; and synthetic resins such as phenol, urea and vinyl chloride resins.

As the surfactants there may be exemplified anionic surfactants such as alkyl sulfuric acid esters (for instance, sodium lauryl sulfate), and aryl sulfonic acids (for instance, alkyl aryl sulfonates and sodium alkyl naphthalane sulfonates); cationic surfactants such as alkyl amines (for instance, lauryl amine, stearyl trimethyl ammonium chloride and alkyl dimethyl benzyl ammonium chloride) and polyoxyethylene alkyl amines; non-ionic surfactants such as polyoxyethylene glycols (for instance, polyoxyethylene alkyl aryl ethers and polyoxyethylene alkyl phenyl ethers), polyoxyethylene glycol esters (for instance, polyoxyethylene fatty acid esters) and polyhydric alcohol esters (for instance, polyoxyethylene sorbitan monolaurate); and amphoteric surfactants.

As the organic material there may be exemplified stabilizers; spreaders (stickers) such as agricultural soaps, casein lime, sodium alginate, polyvinyl alcohol (PVA), soapless soap, coumaron or indene resins and polyvinyl butyl ethers, aerosol propellants such as halogenated hydrocarbons (for instance, Freon); combustive agents for fumigating such as nitrous acid salts, zinc powder and dicyano diamide; oxygen-yielding agents such as perchloric acid salts and di-chlomic acid salts; phytotoxicity-reducing agents such as zinc sulfate, ferrous chloride and copper nitrate; effect-prolonging agents such as terphenyl chloride, dispersion stabilizers such as casein, tragacanth, carboxymethyl cellulose (CMC) and polyvinyl alcohol (PVC); and promoters.

The compounds of this invention may be formed into various preparation adopted in the field of agricultural chemicals. For instance, they are used in the form of liquid or solid preparations such as emulsifiable liquor, concentrated emulsion, wettable powder, wettable tablet, soluble powder and solution; dusts; granules; fumigating agents; smoking agents; spraying agents; and pastes.

The herbicides of this invention contain 0.1–95% by weight, preferably 0.5–90% by weight, of the above-mentioned active component.

In the actual application, the concentration of the active components in the ready-to-use preparation may be varied within a considerably broad range. But it is preferred that the concentration of the active component is generally 0.0001–20% by weight, especially 0.005–10% by weight.

The concentration of the active component may be varied suitably depending on the preparation form, the application method, the object, time and place of the application and the degree of growth of weeds.

In the compound of this invention, it is possible to make co-present other agricultural chemicals such as insecticides, acaricides, nematodicides, antivirus agents, herbicides, fungicides and plant growth regulator or attractants (for instance, organic phosphoric acid esters, carbamate compounds, dithio or thiol carbamate compounds, organic chlorine compounds, dinitro compounds, organosulfur or organometallic compounds, antibiotics substituted diphenyl ethers, urea compounds and triazine compounds), and/or fertilizers.

Herbicidal agents, and ready-to-use preparation containing the active compounds of this invention may be applied in accordance with methods usually adopted in the field of agricultural chemicals such as spraying (for instance, liquid spraying, liquid scattering, misting, atomizing, dust scattering, granule scattering, water surface-applying and pouring); fumigating; soil-applying (for instance, mixing, sprinkling, vaporing and injecting); surface-applying (for instance, coating, banding, powder-coating and covering); and dipping.

It is also possible to apply the agent of this invention in accordance with a so-called "ultra low-volume" spraying method. In this method it is possible to heighten the concentration of the active component to 95%, or even up to 100%.

The rate applied of the active compound of this invention is about 3–1000 g. per 10 ares, preferably 30–600 g. per 10 ares. It is possible or sometimes necessary to apply the agent in an amount exceeding or below the above range.

According to this invention there is provided a herbicidal composition containing as active ingredient a compound of about formula (I) and a solvent and/or a diluent (bulking agent or carrier), optionally together with a surfactant and/or an organic material.

According to this invention there is further provided a herbicidal method comprising applying to weeds or places where weeds grow a compound of above formula (I) alone or in admixture with a solvent and/or diluent (bulking agent or a carrier), optionally together with a surfactant and/or an organic material.

This invention will now be detailed by referring to biotest examples but this invention is not limited by these examples.

Example A (Wettable Powder)

16 parts of compound No. 6 of this invention, 80 parts of a 1:5 mixture of diatomaceous earth and kaolin and 5 parts of an emulsifier ("RUNNOX," polyoxyethylene alkyl aryl ether) were ground and mixed together to form wettable powder. It was diluted with water and applied to weeds and/or places where weeds grew. (Note: The term "part" in example (A) to (G) means weight.)

Example B (Emulsifiable Liquor)

30 parts of compound No. 9 of this invention, 30 parts of xylene, 30 parts of "KAWAKAZOL" (high boiling aromatic hydrocarbon), and 10 parts of an emulsifier "SORPOL" (polyoxyethylene alkyl aryl ether) were mixed under stirring to form an emulsifiable liquor. It was diluted with water and sprayed on weeds and/or places were weeds grew.

Example C (Dust)

2–10 parts of compound No. 13 of this invention and 90–98 parts of a 1:3 mixture of talc and clay were ground and mixed together to form dust. They were scattered on weeds and/or places where weeds grew by a dusting equipment.

Example D (Dust)

1.5–10 parts of compound No. 11, 2 parts of an organic phosphoric acid ester, 0.5 parts of iso-propyl hydrogen phosphate (PAP) and 87.5–96 parts of a 1:3 mixture of talc and clay were ground and mixed together to form dusts. They were scattered on weeds and/or places where weeds grew by a dusting equipment.

Example E (Granule)

25 parts of water was added to a mixture of 10 parts of compound No. 10 of this invention, 10 parts of bentonite, 78 parts of a 1:3 mixture of talc and clay and 2 parts of lignin sulfonate. The admixture was intimately blended and finely divided by means of an extruding granulator to obtain granules of 20–40 mesh, followed by drying at 40–50° C. The resulting granules were sprayed on weeds and/or places where weeds grew.

Example F (Granule)

95 parts of clay particles of a size distribution of 0.2–2 mm. were taken into a rotary mixer and a solution of 5 parts of compound No. 3 of this invention in an organic solvent was sprayed to the particles being rotated, thereby to wet the particles homogeneously. Then they were dried at 40–50° C. to form coated granules. They were sprayed on weeds and/or places where weeds grew.

Example G (Oil Preparation)

0.05–0.5 part of compound No. 1 of this invention, 20 parts of Bersicoal AR-50 (high boiling aromatic hydrocarbon), and 79.5 parts of Deobase (deodorized kerosene) were mixed under stirring to form an oil preparation. It was sprayed on weeds and/or places where weeds grew.

As compared with active compounds of similar structures which have been known from references or known compounds exhibiting similar activities, the active compounds of this invention are characterized in that they exhibit substantially improved effects and have very low toxicity to warm-blooded animals. Accordingly, the compounds of this invention are of great utility.

Unexpectedly excellent effects and advantages of the compounds of this invention will be apparent from the results of tests on effects against various weeds.

Test 1

Test against paddy-field weeds under irrigation conditions with water-application (pot test): Preparation of Sample Chemicals:

Solvent: 5 parts by weight of acetone
Emulsifier: 1 part by weight of benzyloxypolyglycol ether In order to prepare a suitable formulation of an active compound, one part by weight of the active compound was mixed with the above amount of the solvent containing the above amount of the emulsifier, and the mixture was diluted with water to form an aqueous dilution containing the active compound at a prescribed concentration.

Test procedures:

Wagner pots (1/5000 are) were charged with soil from rice paddy fields. Two seedlings of rice plant (Kinmaze variety) at the three- or four-leafed stage (about 15 cm. height) are transplanted per pot. After the seedlings had taken root, seeds of barnyard grasses, flat sedges and broad-leafed weeds were sown, and spikerushes were planted and then watered to a depth of about 6 cm. The chemical in the form of an emulsion prepared in the above manner was applied in a prescribed amount by means of a pipette. After the chemical treatment, water was leaked for 2 days in an amount corresponding to 2–3 cm. depth per day, and then the water-filling depth was maintained at about 3 cm. Four weeks after the chemical treatment, the controlling effects and phytotoxicity were evaluated on a scale from 0 to 5 as shown below, where the weed killing ratio and the phytotoxicity ratio of the untrated pot were 0%.

Herbicidal effect:                Weed killing ratio
5 _____ more that 95% (withered).
4 _____ more than 80%.
3 _____ more than 50%.
2 _____ more than 30%.
1 _____ more than 10%.
0 _____ less than 10% (no effect).

Phytotoxicity:                    Phytotoxicity ratio
5 _____ more than 90% (fatal damage).
4 _____ more than 50%.
3 _____ more than 30%.
2 _____ less than 30%.
1 _____ less than 10%.
0 _____ 0% (no phytotoxicity).

Results are shown in Table 2.

TABLE 2

[Results of tests against paddy-field weeds under irrigation conditions with water-application]

| Compound number | Amount of active ingredient (g./10 ares) | Effect | | | | Phytotoxicity |
|---|---|---|---|---|---|---|
| | | Barnyard grass | Flat sedge | Spikerush | Broad leaves | Rice plant |
| 1 | 500 | 4–5 | 4–5 | 4 | 4–5 | 0 |
| | 250 | 4–3 | 3–4 | 4 | 4 | 0 |
| | 125 | 3 | 3 | 3 | 3 | 0 |
| 2 | 500 | 4–5 | 5 | 4 | 4–5 | 0 |
| | 250 | 4 | 5 | 4–5 | 4 | 0 |
| | 125 | 3 | 4 | 3–4 | 3 | 0 |
| 3 | 500 | 5 | 5 | 4–5 | 4–5 | 0 |
| | 250 | 5 | 5 | 4–5 | 4 | 0 |
| | 125 | 5 | 4 | 3–4 | 3 | 0 |
| 4 | 500 | 5 | 4–5 | 4–5 | 5 | 0 |
| | 250 | 5 | 4 | 4–5 | 4 | 0 |
| | 125 | 4–5 | 3–4 | 4 | 4 | 0 |
| 5 | 500 | 5 | 5 | 4–5 | 4–5 | 0 |
| | 250 | 5 | 4 | 4–5 | 4 | 0 |
| | 125 | 3–4 | 3–4 | 3–4 | 4 | 0 |
| 6 | 500 | 5 | 5 | 5 | 5 | 0 |
| | 250 | 5 | 5 | 4–5 | 4 | 0 |
| | 125 | 5 | 4–5 | 4 | 4 | 0 |
| 7 | 500 | 5 | 4–5 | 4 | 4 | 0 |
| | 250 | 5 | 4 | 3–4 | 3–4 | 0 |
| | 125 | 4 | 3 | 3 | 3 | 0 |
| 8 | 500 | 5 | 4–5 | 4–5 | 5 | 0 |
| | 250 | 5 | 4 | 4 | 4 | 0 |
| | 125 | 5 | 3 | 3 | 3 | 0 |
| 9 | 500 | 5 | 5 | 4–5 | 4–5 | 0 |
| | 250 | 5 | 5 | 4 | 4–5 | 0 |
| | 125 | 5 | 4–5 | 3 | 4 | 0 |
| 10 | 500 | 5 | 5 | 5 | 5 | 0 |
| | 250 | 5 | 5 | 4–5 | 5 | 0 |
| | 125 | 5 | 4–5 | 4 | 4 | 0 |
| 11 | 500 | 5 | 4 | 4 | 5 | 0 |
| | 250 | 5 | 4 | 3–4 | 4 | 0 |
| | 125 | 4–5 | 3 | 3 | 3 | 0 |
| 12 | 500 | 5 | 5 | 5 | 5 | 0 |
| | 250 | 5 | 5 | 4–5 | 5 | 0 |
| | 125 | 4–5 | 4–5 | 4 | 4 | 0 |
| 13 | 500 | 5 | 5 | 5 | 5 | 0 |
| | 250 | 5 | 5 | 4–5 | 5 | 0 |
| | 125 | 5 | 4–5 | 4 | 4 | 0 |
| 14 | 500 | 5 | 5 | 5 | 5 | 0 |
| | 250 | 5 | 5 | 4–5 | 5 | 0 |
| | 125 | 5 | 4–5 | 4 | 4 | 0 |
| PCP | 500 | 4 | 4 | 1 | 4 | 0 |
| | 250 | 1 | 1 | 0 | 0 | 0 |
| | 125 | 0 | 0 | 0 | 0 | 0 |
| Nitrofen | 500 | 5 | 4 | 5 | 5 | 3 |
| | 250 | 5 | 2 | 5 | 5 | 1 |
| | 125 | 3 | 1 | 1 | 2 | 0 |

NOTES.—
(1) Compound numbers correspond to those of Table 1.
(2) Broad-leaves include Monochoria vaginalis, Rotala indical, Lindernia pyxidaria, Dopatrium junceum, etc.
(3) PCP: pentachlorophenol. (Commercially available comparison.)
(4) Nitrofen: 2,4-dichlorophenyl-4'-nitrophenyl ether. (Commercially available comparison.)

Test 2

Test against paddy-field weeds under irrigation conditions with treatment of stalks and leaves (pot test):

Wagner pots (1/5000 are) were charged with soil from rice paddy field. Two seedlings of rice plant (Kinmaze variety) at the three- or four-leafed stage (about 15 cm. height) were transplanted per pot. Seeds of barnyard grass, flat sedge, and broad-leafed weeds were sown, and soil was infected with spikerush. Then, the soil was kept in the wet stage. When barnyard grass grew to about two-leafed stage (about 7–9 days after inoculation), the pots were watered to a depth of about 6 cm. The chemical in the form of an emulsion prepared in the same manner as in Test 1 was applied in a prescribed amount by means of a pipette. After the chemical treatment, water was leaked for 2 days in an amount corresponding to 2–3 cm. depth per day, and then the water-filling depth was maintained at about 3 cm. Four weeks after the chemical treatment, the controlling effects and phytotoxicity were evaluated on the same scale as in Test 1.

Results are shown in Table 3.

TABLE 3

[Results of test against paddy-field weeds under irrigation conditions with treatment of stalks and leaves (pot test)]

| Compound number | Amount of active ingredient (g./10 ares) | Effect Barn-yard grass | Flat sedge | Spike-rush | Broad leaves | Phyto-toxicity Rice plant |
|---|---|---|---|---|---|---|
| 3 | 500 | 5 | 4-5 | 4 | 4 | 0 |
|   | 250 | 5 | 4 | 3 | 4 | 0 |
|   | 125 | 4 | 3 | 3 | 3 | 0 |
| 6 | 500 | 5 | 4-5 | 4-5 | 4-5 | 0 |
|   | 250 | 5 | 4 | 4 | 4 | 0 |
|   | 125 | 4-5 | 3 | 3 | 3 | 0 |
| 9 | 500 | 5 | 4-5 | 4 | 4 | 0 |
|   | 250 | 4 | 4 | 3 | 4 | 0 |
|   | 125 | 4 | 3 | 3 | 3 | 0 |
| 10 | 500 | 5 | 4-5 | 4-5 | 4 | 0 |
|   | 250 | 4-5 | 4 | 4 | 4 | 0 |
|   | 125 | 4 | 3 | 3 | 3 | 0 |
| PCP [1] | 750 | 3 | 0 | 0 | 3 | 0 |
|   | 500 | 0 | 0 | 0 | 0 | 0 |

[1] Commercially available comparison.

Test 3

Test of effects on various plants by pre-emergence application.

Seeds of upland rice plant, vegetable and weeds were sown on soil-charged pots (30 cm. x 30 cm.), and 24 hours later, the active compound in the form of an emulsion prepared in the same manner as in Test 1 was applied to the soil surface in an amount of 20 kg., 10 kg., 5 kg. or 1.25 kg. per hectare, calculated as the active compound. Three weeks after the chemical treatment, the damage given to upland rice plant, vegetable and weeds was evaluated on a scale from 0 to 5 as shown below:

0: no influence
1: slight damage and slight growth retardation
2: considerable damage and considerable growth retardation
3: extreme damage and only 50% of seeds germinated
4: only 25% of seeds germinated
5: complete extinction with no germination Results are shown in Table 4.

TABLE 4

Result of test on effects on various plants by pre-emergence application

Compound

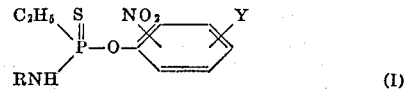

(Compound No. 6 of this invention)

| Amount of active ingredient (kg./ha.) | 20 | 10 | 5 | 2.5 | 1.25 |
|---|---|---|---|---|---|
| Wheat | 5 | 2 | 0 | 0 | 0 |
| Barley | 5 | 2 | 0 | 0 | 0 |
| Rice plant | 5 | 2 | 0 | 0 | 0 |
| Cotton | 5 | 2 | 0 | 0 | 0 |
| Maize | 5 | 2 | 0 | 0 | 0 |
| Cabbage | 5 | 2 | 0 | 0 | 0 |
| Barnyard grass (Echinochloa) | 5 | 5 | 5 | 5 | 5 |
| Common purslane (Portulaca) | 5 | 5 | 5 | 5 | 4 |
| Goosefoot (Chenopodium) | 5 | 5 | 5 | 5 | 4 |
| Chick-weed (Stellaria) | 5 | 5 | 5 | 5 | 4 |
| Wild amaranthus (Amaranthus) | 5 | 5 | 5 | 5 | 3-4 |
| Crab grass (Digitaria) | 5 | 5 | 5 | 5 | 5 |

It will be understood that the specification and examples are illustrative but not limitative of the present invention and that other embodiments within the spirit and scope of the invention will suggest themselves to those skilled in the art.

What is claimed is:

1. Amidothionophosphonic acid ester compound of the formula $$\underset{RNH}{\overset{C_2H_5}{\diagdown}}\overset{S}{\underset{\parallel}{P}}-O-\underset{}{\overset{NO_2}{\diagup}}\text{—}Y \qquad (I)$$

wherein R is lower alkyl or cycloalkyl of from 5 to 6 ring carbon atoms; and
Y is hydrogen, halogen or lower alkyl.

2. Compound as claimed in claim 1 wherein R in formula I is lower alkyl containing up to about four carbon atoms.

3. Compound as claimed in claim 1 wherein R in formula I is cyclopentyl.

4. Compound as claimed in claim 3 wherein R in formula I is cyclohexyl.

5. Compound as claimed in claim 1 wherein Y in formula I is hydrogen.

6. Compound as claimed in claim 1 wherein Y in formula I is halogen.

7. Compound as claimed in claim 6 wherein the halogen is chlorine or bromine.

8. Compound as claimed in claim 1 wherein Y is lower alkyl of from one to about four carbon atoms.

9. Compound as claimed in claim 1 wherein Y in formula I is linked to the phenol ring at the 4-position of said ring.

10. Compound as claimed in claim 1 designated O-(2-nitrophenyl)-N-isopropyl-ethanethionophosphonamide.

11. Compound as claimed in claim 1 designated O-(2-nitro-4-methylphenyl) - N - isopropyl-ethanethionophosphonamide.

12. Compound as claimed in claim 1 designated O-(2-nitrophenyl)-N-sec.-butyl-ethanethionophosphonamide.

13. Compound as claimed in claim 1 designated O-(2-nitro-4-methylphenyl) - N - sec.-butyl-ethanethionophosphonamide.

14. Compound as claimed in claim 1 designated O-(2-nitrophenyl)-N-cyclohexyl-ethanethionophosphonamide.

15. Compound as claimed in claim 1 designated O-(2-nitro-4-tert.-butylphenyl)-N-isopropyl - ethanethionophosphonamide.

16. Compound as claimed in claim 1 designated O-(2-nitro-4-chlorophenyl) - N - isopropyl-ethanethionophosphonamide.

17. Compound as claimed in claim 1 designated O-(2-nitro-4-bromophenyl) - N - isopropyl-ethanethionophosphonamide.

References Cited

UNITED STATES PATENTS 3,260,712   7/1966   Schrader _____ 260—954 XR
3,472,920   10/1969  Schrader et al. _____ 260—954

ANTON H. SUTTO, Primary Examiner

US. Cl. X.R.

71—87